United States Patent
Cheema et al.

(10) Patent No.: US 8,335,815 B1
(45) Date of Patent: Dec. 18, 2012

(54) METHODS AND SYSTEMS FOR AUTOMATING DATA TRANSACTIONS IN A CLEC INTERFACE MODEL

(75) Inventors: Farooq I. Cheema, Raleigh, NC (US); Shawna C. Johnson, Raleigh, NC (US); Rachael Amber Espinoza, Wake Forest, NC (US); Zyad A. Dwekat, Raleigh, NC (US); Vernique Leathers, Raleigh, NC (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1508 days.

(21) Appl. No.: 11/125,994

(22) Filed: May 10, 2005

(51) Int. Cl.
  *G06F 15/16* (2006.01)
  *G06Q 10/00* (2012.01)
  *H04M 11/00* (2006.01)

(52) U.S. Cl. .................... 709/202; 379/112.08; 705/7.11

(58) Field of Classification Search .................. 709/202; 379/112.08; 705/7.11
See application file for complete search history.

(56) References Cited

U.S. PATENT DOCUMENTS

| | | | |
|---|---|---|---|
| 4,776,004 A * | 10/1988 | Bauer et al. | 379/127.01 |
| 5,687,224 A * | 11/1997 | Alley et al. | 379/201.12 |
| 6,640,143 B1 * | 10/2003 | Lee et al. | 700/32 |
| 6,661,888 B2 * | 12/2003 | Bell et al. | 379/221.13 |
| 6,813,278 B1 * | 11/2004 | Swartz et al. | 370/466 |
| 6,983,037 B2 * | 1/2006 | Argo | 379/15.03 |
| 7,328,166 B1 | 2/2008 | Geoghegan et al. | |
| 7,376,617 B2 | 5/2008 | Jones | |
| 2005/0169449 A1 * | 8/2005 | Coughlin et al. | 379/201.12 |
| 2006/0050861 A1 * | 3/2006 | McIntosh et al. | 379/219 |

* cited by examiner

*Primary Examiner* — George C Neurauter
(74) *Attorney, Agent, or Firm* — Swanson & Bratschun, L.L.C.

(57) ABSTRACT

The present invention provides methods and systems for automating data transactions in a CLEC interface model. A computer-implemented method for provisioning trunk circuit orders is provided with an interne interface to a computing device to exchange information. A trunk order issued by a first organization is received at the computing device. A first notification of the trunk order is sent to a second organization. A confirmation in response to the trunk order is received at the computing device. A common interface is provided for information exchange. Processing time is decreased for modifying, creating, and deleting trunk circuits in a telecommunications network. Records are maintained and automatically cataloged with time and date-stamps to keep a history for reference.

8 Claims, 2 Drawing Sheets

METHODS AND SYSTEMS FOR AUTOMATING DATA TRANSACTIONS IN A CLEC INTERFACE MODEL

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

This invention relates to the field of computer software to automate data transactions. It includes embodiments covering networking, database management, graphic user interfaces, and telecommunications.

BACKGROUND OF THE INVENTION

The Telecommunications Act of 1996 spawned an era marked by the proliferation of the competitive local exchange carrier (CLEC). CLECs were given the opportunity to flourish under this new law that regulated the incumbent local exchange carrier (ILEC). Originally, the ILEC owned the telecommunications infrastructure and physical access to customers. The Act changed the manner in which ILECs did business by allowing CLECs to use the ILEC's infrastructure to have access to their customers. Along with the Act, the government implemented mechanisms to monitor the law's progress. Part of the monitoring process is carried out by the Federal Communications Commission (FCC), which can levy fines and penalties for non-compliance with any portion of the Act. In many instances, ILECs have been fined for non-compliance with the ACT, not because of any provable wrongdoing, but because the ILEC did not maintain records to prove that it acted in conformance with the ACT. Thus, the government implements strict enforcement measures to ensure that CLECs are given ample opportunities to compete.

The ILECs face many problems in dealing with CLECs. On one hand the CLECs are theoretically customers of the ILECs; but on the other hand, the CLECs compete directly with the ILECs. This makes for an unusual relationship in that the ILEC has to be responsive to the CLEC but also has to be wary of shared information. Certain protocols need to be followed to prevent conflicts of interest, to prevent any unfair advantage between the ILEC and CLEC, and to comply with FCC requirements.

Out of the relationship discussed above, some problems occur. The ILEC may experience a lack of resources to handle relationships with multiple CLECs. In some cases, the ILEC may need to deal with over thirty (30) CLECs simultaneously. A lot of time is spent with each CLEC that, taken together, amounts to a significant amount of time and financial cost. In addition, each CLEC has a preferred method of how they conduct business, which is not always conducive for the ILEC that has to interoperate with each of them. In some cases, the CLEC may lack technical or business prowess to address telecommunications issues because they may be a new entrant into the market. This leads to receiving inaccurate data from the CLEC. Further, the CLEC may be unfamiliar with augmenting, creating, and deleting trunk circuits. In this case, the ILEC has to support the CLEC in achieving its goals while maintaining confidentiality so no one CLEC has an advantage over another CLEC.

There is a desire to harmonize the interactions between the ILEC and multiple CLECs. Information needs to be kept in a central repository in case of disputes with the CLECs or a matter before a state's public utilities commission.

SUMMARY OF THE INVENTION

This disclosure describes, among other things, methods and systems for automating data transactions in a competitive local exchange carrier (CLEC) interface model. Offering several practical applications in the technical arts, embodiments of the present invention automate data transactions, establish a common format and process among different entities, and store and track data for later searching and review. The present invention provides methods and systems to overcome these and many other obstacles. In some embodiments, it decreases the processing time for modifying, creating, and deleting new circuits in the telecommunications network. It automatically catalogs data with time-stamps to keep a history for reference in case a dispute arises. It reduces the processing time for trunk modifications and creations. It maintains records for the benefit of both the ILEC and CLEC. It provides a common interface for information exchange.

In a first aspect, a method is provided for automating information that includes sending a first information to a computing device. The information is accessible at the computing device over a network connection. Either, a notification is sent to a user about the first information or a notification is sent from the computing device to a user about the first information subsequent to receiving the first information at the computing device. A notification is received from the computing device. The notification is generated when a second information is created at the computing device.

In a second aspect, a method for automating trunk circuit orders is provided that includes issuing a trunk order to an organization at a computing device. The trunk order is stored in a data store. A confirmation of the trunk order is received from the organization. The confirmation is also stored in the data store. A trunk circuit order is generated from the trunk order and the confirmation. The trunk circuit order is also stored in the data store.

In a third aspect, a method for provisioning trunk circuit orders is implemented that includes providing an Internet interface to a computing device to exchange information. A trunk order issued by a first organization is received at the computing device. In response to receiving the trunk order, a notification of the trunk order is sent to a second organization. A confirmation in response to the trunk order is received at the computing device. In response to receiving the confirmation, a notification of the confirmation is sent to the first organization.

In a fourth aspect, another method is also provided for automating trunk circuit orders. The method includes receiving a first information set at computing devices connected together in a network over a communication channel. The first information set contains trunk information. The first information set is stored in a data store accessible by the computing devices. A second information set is created in response to the first information set. The second information set contains a confirmation. The second information set is stored in the data store.

BRIEF DESCRIPTION OF THE SEVERAL VIEWS OF THE DRAWINGS

The present invention is described in detail below with reference to the attached drawing figures, which are incorporated herein by reference, and wherein.

DETAILED DESCRIPTION OF THE INVENTION

Figure 1:
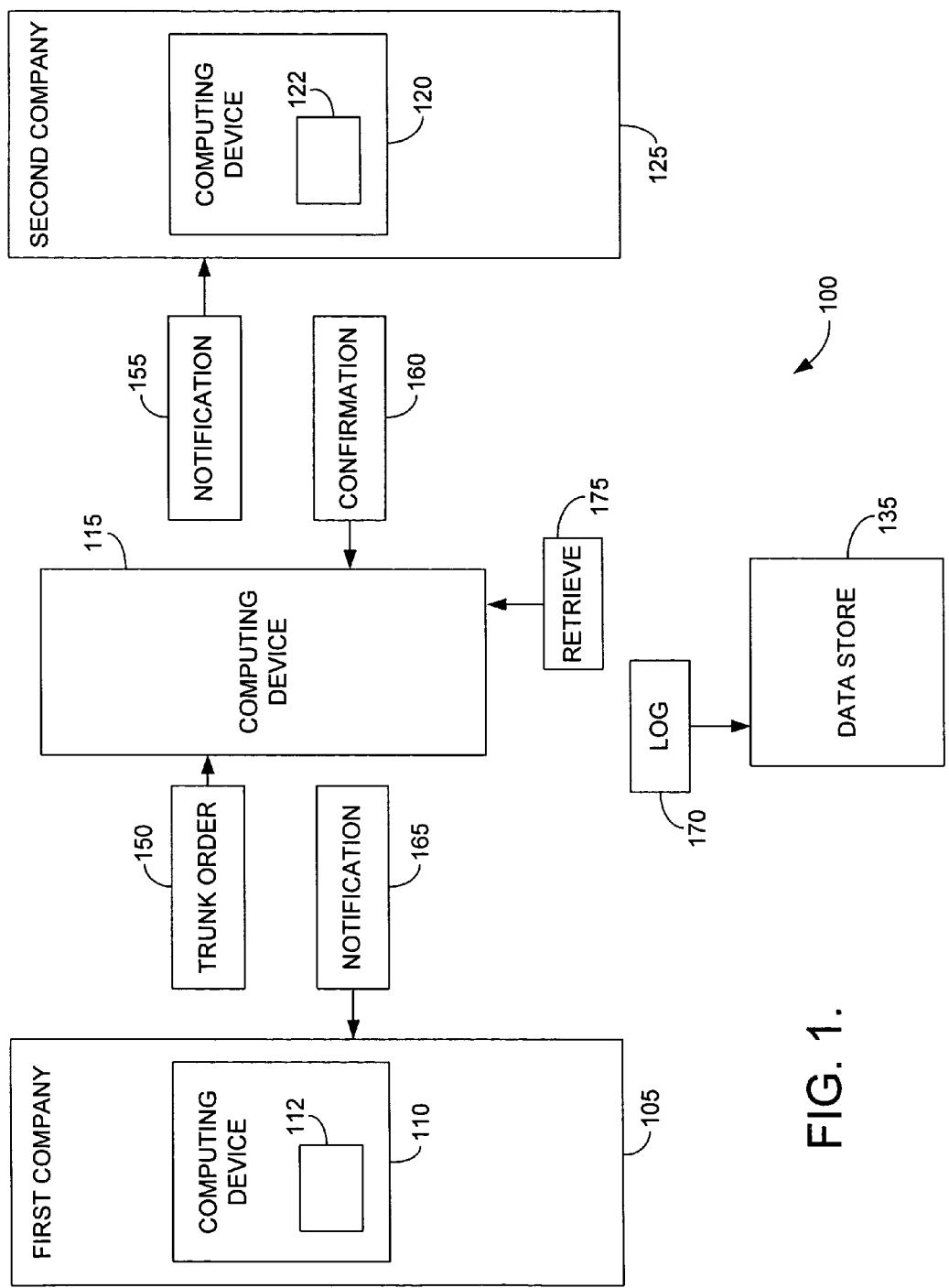
FIG. 1 is a block diagram of an exemplary communication exchange in accordance with an embodiment of the present invention.

The present invention will be better understood from the detailed description provided below and from the accompanying drawings of various embodiments of the invention, which describe, for example, methods and systems for automating data transactions in a CLEC interface model. The detailed description and drawings, however, should not be read to limit the invention to the specific embodiments. Rather, these specifics are provided for explanatory purposes that help the invention to be better understood.

Specific hardware devices, programming languages, components, processes, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or networks.

The present invention may be embodied as, among other things: a method, system, computer-program product, or combinations thereof. Accordingly, the present invention may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and non-removable media, and contemplate media readable by a machine, database, or various other network devices.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

To help explain the invention without obscuring its functionality, embodiments will now be referenced in connection with a computing network. Although the present invention can be employed in connection with a computing-network environment, it should not be construed as limited to the exemplary applications provided here for illustrative purposes.

CLEC Interface Model

In FIG. 1, a block diagram of a network 100 is shown depicting a first company 105, a computing device 115, a data store 135, and a second company 125. First company 105 contains a computing device 110 and a web interface 112 to communicate with computing device 115 and any other devices. Second company 125 contains a computing device 120 and a web interface 122 to communicate with computing device 115. Both first company 105 and second company 125 exchange messages with computing device 115 as shown by a trunk order 150, a notification 155, a confirmation 160, and a notification 165. Much of the information that flows through computing device 115 is exchanged with data store 135.

The illustration in FIG. 1 is an exemplary embodiment of the present invention. It shows an interaction scheme of one transaction between first company 105 and second company 125. However, many more transactions may occur between either first company 105, second company 125, or other entities not shown. Data flow may occur between two entities when practicing an embodiment of the present. Likewise, an alternative block diagram may be shown that illustrates other possibilities in practicing an embodiment of the present invention. Some of these alternatives will be discussed below within the discussion of FIG. 1.

First company 105 may be a business entity or corporate environment that may have many computing devices. Only computing device 110 is shown, for illustrative purposes. Along with computing device 110, web interface 112 provides a user with access to a network connection or the Internet. Through web interface 112, the user may access email, other computing devices like computing device 115, web sites, or entities like second company 125.

Assume first company 105 wants to automate information that flows between it and other companies. First company 105 may interact with other companies using the same process, including timing and formatting of information. Therefore, rather than having each company interact with first company 105 in a specific manner, the illustration shows an embodiment for all companies to implement and use the same process.

For explanatory purposes here, first company 105 may be a telecommunications provider and second company 125 may be a competitive local exchange carrier (CLEC). The CLEC is a telephone company that competes with an incumbent local exchange carrier (ILEC). As previously mentioned, CLECs are allowed to use the ILEC infrastructure. CLECs have access to facilities and equipment owned by the ILEC giving the CLEC access to ILEC customers. Although not required, the discussion below may be clearer by viewing first company 105 as the ILEC and second company 125 as the CLEC.

Both first company 105 and second company 125 operate in the telecommunication sector to provision services to the public. In this example, first company 105 and second company 125 may negotiate the use of telecommunications equipment across a network. Along with that negotiation, there is a need to document transactions between both companies to ensure that each party executes agreements that may result from the negotiation. An embodiment of the present invention may provide a documentation trail to prove to the FCC that commitments are being implemented and honored. Although the FCC is not shown in FIG. 1, the FCC provides oversight to transactions that may occur between first company 105 and second company 125. If one party is not operating within FCC guidelines or cannot prove that it has operated appropriately, the FCC may impose penalties to encourage compliance.

In FIG. 1, a first user at first company 105 may send trunk order 150 to computing device 115 for use by second company 125. Computing device 115 may log trunk order 150, shown in 170, into data store 135 with its time and date stamp. Second company 125 may have several options to know that trunk order 150 has been issued by first company 105. It may affirmatively use its computing device 120 and web interface 122 to access computing device 115 over the interne to retrieve trunk order 150 from data store 135. Or, it may receive notification 155 advising that trunk order 150 is available. Notification 150 may be an email message, regular mail, facsimile, wireless message, or page. Notification 150 may also contain the information of trunk order 150 or it may contain information directing a second user where to obtain trunk order 150.

Trunk order 150 may contain such information as the number of trunk groups, the number of trunks in a trunk group, routing information for the trunks and trunk group, signaling information, facility information for DS3 and T1 circuits, and contact information. This list is by no means exhaustive and more information may be contained in trunk order 150, as would be applicable by one ordinarily skilled in the art. Also, a subset of the information described above may be included as well. In the telecommunication environment, trunk order 150 may be referred to as a Reciprocal ASR.

Second company 125 may read the information conveyed in trunk order 150 or notification 155 to provide confirmation 160. Confirmation 160 may contain an acknowledgement from second company 125 that trunk order 150 has been received. It may also include an agreement to the information contained in trunk order 150 or include further modifications. Confirmation 160 may contain similar information to trunk order 150 in order to reach agreement with company 105. Confirmation 160 may be the information sent to company 105 illustrating second company 125's agreement and compliance from all prior negotiations.

Confirmation 160 may be sent to computing device 115 in the same manner as was trunk order 150. Confirmation 160 may be stored in data store 135 along with its time and date stamp. As discussed earlier regarding notification 155, notification 165 may be sent to company 105 to apprise company 105 of the existence of confirmation 160. Or, first company 105 may query computing device 115 for confirmation 160 by accessing computing device 115 over the Internet through the network connection with computing device 110 and web interface 112. Notification 165 may contain a short message or it may contain the same information as included in confirmation 160. As stated for notification 155, notification 165 may also be an email message, regular mail, facsimile, wireless message, or page.

Computing device 115 may be the central point for the transactions between first company 105 and second company 125. However, more computing devices may be used in this manner to send and receive similar information as discussed above. Consequently, all transactions may be logged at 170 into data store 135. Data store 135 may be a database, spreadsheet, storage medium, disk, memory, array, or other data structure. Data store 135 may be located at computing device 115 or at another location remote from data store 135. Data store 135 may comprise one storage device or a series of storage devices that are connected together.

As discussed above about the FCC requirements, data store 135 may provide a means to provide proof of information to either first company 105 or second company 125. Information may be retrieved from data store 135, as shown in 175, by time and date stamp. Users may access information through their web interfaces (i.e. web interface 112 or web interface 122) to connect over the internet to data store 135. Users may search or review transactions that are stored. Information access may be secured with a login and password to restrict companies from viewing one another's information. For example, second company 125 may only be able to view information related to its transactions with first company 105. Alternatively, first company 105 may be able to view all information stored in data store 135. Users may be able to view past transactions as well as current transactions related to trunk order 150, notification 155, confirmation 160, and notification 165. In addition, although not shown in FIG. 1, other information may be kept in data store 135 such as updates, in-service trunk circuit information, and statuses.

One may understand that computing device 115 may exist in at least three configurations. First, computing device 115 may exist in the network separate from either first company 105 or second company 125 and administered by a third party. Secondly, computing device 115 may exist as part of the network for first company 105. Thirdly, computing device 115 may exist as part of the network for second company 125. Regardless of the configurations, the flow of information may remain the same.

Figure 2:
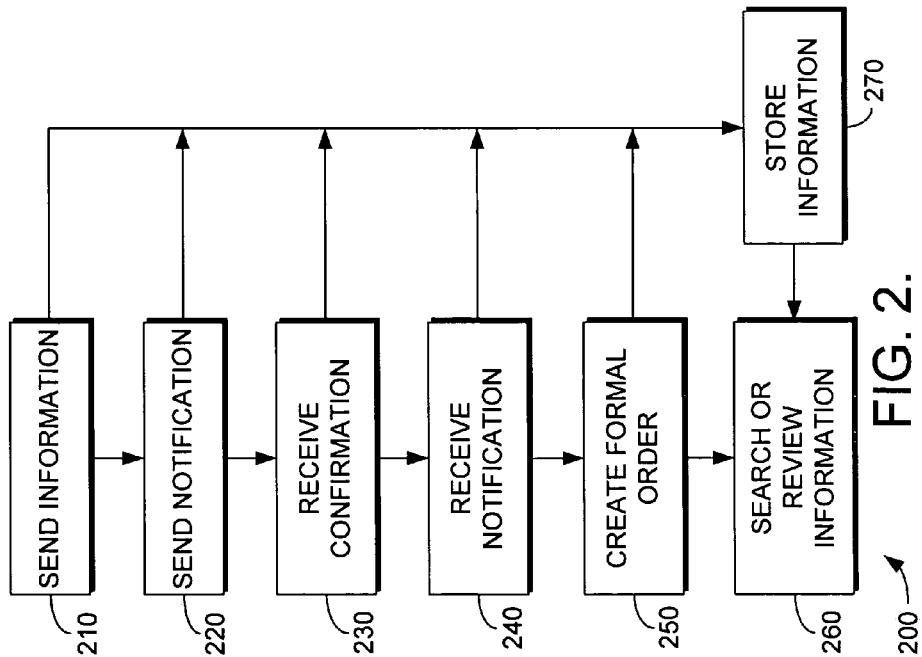
FIG. 2 is a first flowchart illustrating an exemplary operating process in accordance with an embodiment of the present invention.

Turning now to FIG. 2, a flowchart illustrating an exemplary process for automating trunk circuit orders is shown in a process 200. Process 200 shows several steps from the perspective of a company working with one or more other companies. As discussed earlier, the company may be a telecommunications provider or a company needing to organize, manage, and synchronize its relationship with the other companies. The other companies may be competitive local exchange carriers or other types of companies.

Process 200 operates to automate the creation of trunk circuit plans, and provides a consistent approach to communicate the same information between to one or more entities. Process 200 implements an automated process that may help users act on time-sensitive information when it becomes necessary.

In a step 210, information is sent from a first user to a second user. This step corresponds to trunk order 150 in FIG. 1. The first user corresponds to company 105 in FIG. 1 while the second user corresponds to company 125. In a step 220, notification 155 is delivered to the second user. Step 220 may be executed at the same time as step 210 or at some time thereafter. The notification can either be sent at the same time as the information is sent, or it can be sent after the information is sent. In a step 230, the first user receives a confirmation from the second user. The confirmation corresponds to confirmation 160 discussed earlier. The first user also receives a notification in a step 240 similar to notification 165. As discussed earlier, the first user may query computing device 115 to find the confirmation or may use the notification as an alert of the confirmation.

As discussed earlier, the information from step 210 and step 230 may relate to telecommunication details regarding the provisioning of telecommunication equipment in the network. However, the information may relate to other activities surrounding the relationship and agreements of the two entities. By using the information of step 210 and step 230, a formal order may be created as shown in a step 250. The formal order may contain a dynamic set of information that may change depending on the agreements negotiated between the entities. For example, the formal order may include a final trunk circuit order containing such details as the time for implementation, agreed upon dates, authorization information, as well as the information discussed earlier in trunk order 150 and confirmation 160. Likewise, the information generated by step 250 may be stored in data store 135 as shown by a step 270.

The illustration of FIG. 2 depicts an exemplary embodiment of the present invention. The execution of the steps may change depending on the circumstances and desires of the implementer. Several steps may be executed without regard to order, and some steps may be omitted entirely.

Figure 3:
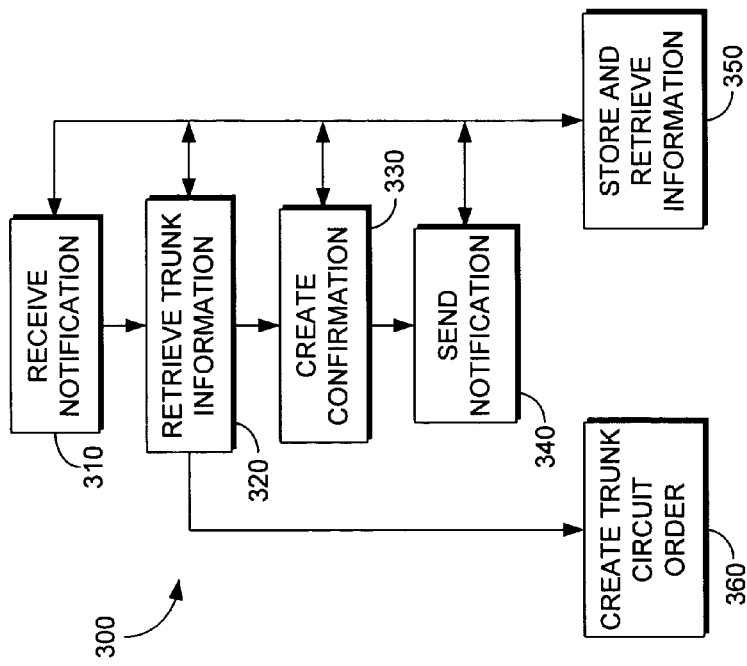
FIG. 3 is a second flowchart illustrating an exemplary operating process in accordance with an embodiment of the present invention.

In FIG. 3, another flowchart is shown illustrating an exemplary embodiment suitable for practicing the present invention. Process 300 shows several steps that are executed from the perspective of the CLEC for purposes of explaining FIG. 3. The perspective does not have to be that of the CLEC and could very well by any type of company.

Prior to execution of steps in FIG. 2, the CLEC and ILEC may have engaged into several conversations whereby information is agreed upon. The conversations may involve very in depth discussions about the provisioning of telecommunication equipment in the network. From the series of meetings, the ILEC and CLEC may agree on pertinent points, and the ILEC may develop information to send to the CLEC as discussed below.

In a step 310, the CLEC may receive notification of an available trunk order. The notification may be received by various means and may contain various amounts data as discussed earlier. The notification is representative of notification 155. In a step 320, the CLEC may retrieve the trunk order at computing device 115. Step 310 appears before step 320 which may be different from discussion of FIG. 1 and FIG. 2. This is because it is probable that the CLEC may become aware of the trunk order through the notification. Then, the CLEC may retrieve the trunk order from computing device 115. However, the CLEC may implement a procedure to intermittently query for the trunk order using computing device 110 to search computing device 115 over an interne connection, thus, retrieving the trunk order before the notification.

From previous agreements and trunk order 150, the CLEC may create a confirmation in a step 330. The confirmation is delivered to computing device 115. Along with the confirmation or thereafter, a notification of the confirmation may be sent to the ILEC in a step 340. From the trunk order and the confirmation, a trunk circuit order may be created in a step 360. The trunk circuit order may be used to perform the provisioning of physical equipment in the network. The trunk circuit order may function as the finalized formal agreement between the ILEC and the CLEC.

As discussed in FIG. 2, information generated and transferred with process 300 may be stored with a time and date stamp in a step 350. Step 350 corresponds to 170, 175, and data store 135 in FIG. 1. The ILEC and CLEC may review previously stored information and perform searches to gather information when needed. The information stored in data store 135 may provide a way to prove certain transactions, especially if compliance is mandated.

As FIG. 3 is discussed using the examples of the ILEC and CLEC, the illustration and explanations are merely exemplary to show one embodiment of the present invention. The execution of the steps may change depending on the circumstances and desires of the implementer as stated in FIG. 2 as well. Step 360 may be omitted while other steps may be executed without regard to the order as shown.

One skilled in the art will appreciate that methods and systems in accordance with the present invention may be implemented using computer software. Such software may take the form of computer-readable code embodied on one or more computer-readable media. Software implementing the present invention may operate independently, but may also be incorporated with other software or vendor programs. Various software languages may be used to implement methods and systems in accordance with the present invention.

The invention claimed is:

1. An automated method of creating an audit trail and repository for recording the processing of trunk orders made between a CLEC and an ILEC for purposes of demonstrating regulatory compliance, the method comprising:

receiving at a first computing device an electronic trunk order issued from a second computing device;

generating by the first computing device a first electronic time stamp in response to the received trunk order;

saving by the first computing device the first electronic time stamp and the electronic trunk order in an electronic repository;

communicating by a third computing device a confirmation of the trunk order;

generating by the first computing device a second electronic time stamp in response to the communicated confirmation;

saving by the first computing device the second electronic time stamp and the confirmation in the electronic repository;

generating by the first computing device a trunk circuit order in response to the received trunk order;

generating by the first computing device a third electronic time stamp in response to the generated trunk circuit order;

saving by the first computing device the third electronic time stamp and the trunk circuit order in the electronic repository;

intermittently querying using the third computing device to search the first computing device for the trunk order prior to the trunk order being received by the third computing device, thereby the CLEC retrieving the electronic trunk order before receiving a notification of the electronic trunk order; and permitting access by the CLEC to the electronic time stamps stored in the electronic depository and the ILEC for purposes of allowing them to verify regulatory compliance.

2. The method of claim 1, wherein permitting access by the CLEC comprises restricting access to the electronic time stamps of a second CLEC.

3. The method of claim 1, wherein permitting access by the CLEC comprises permitting access by a plurality of CLECs to the electronic depository.

4. The method of claim 3, and further comprises permitting access by one of the plurality of CLECs to electronic time stamps associated with the one of the plurality of CLECs and restricting access by the one of the plurality of CLECs to electronic time stamps not associated with the one of the plurality of CLECs.

5. The method of claim 1, further comprising positioning the first computing device at a network of the second computing device.

6. The method of claim 1, further comprising positioning the first computing device at a network of the third computing device.

7. The method of claim 1, wherein the second computing device is at a first company.

8. The method of claim 7, wherein the third computing device is at a second company.

* * * * *